United States Patent
Howard

(10) Patent No.: US 6,179,318 B1
(45) Date of Patent: Jan. 30, 2001

(54) HITCH GUIDE

(76) Inventor: Ethen B. Howard, R.R. 2, Box 71, Merna, NE (US) 68856

( * ) Notice: Under 35 U.S.C. 154(b), the term of this patent shall be extended for 0 days.

(21) Appl. No.: 09/357,008

(22) Filed: Jul. 19, 1999

(51) Int. Cl.[7] ............................................. B60D 1/36
(52) U.S. Cl. .......................... 280/477; 280/504; 280/511
(58) Field of Search ................................... 280/477, 511, 280/504

(56) References Cited

U.S. PATENT DOCUMENTS

| | | |
|---|---|---|
| D. 311,511 | 10/1990 | Craig . |
| 3,150,884 | 9/1964 | Drott . |
| 3,837,675 | 9/1974 | Barnes et al. . |
| 4,176,853 | 12/1979 | Brock . |
| 4,254,968 | 3/1981 | DelVecchio . |
| 4,320,907 | 3/1982 | Eaton . |
| 4,792,151 | 12/1988 | Feld . |
| 4,799,705 * | 1/1989 | Janes et al. ........................... 280/477 |
| 4,844,496 | 7/1989 | Webb et al. . |
| 5,114,170 | 5/1992 | Lanni et al. . |
| 5,465,992 * | 11/1995 | Anderson ............................. 280/477 |
| 5,482,309 | 1/1996 | Hollis . |
| 5,503,422 * | 4/1996 | Austin ................................. 280/477 |
| 5,529,330 * | 6/1996 | Roman ................................. 280/477 |
| 5,697,630 * | 12/1997 | Thompson et al. .................. 280/477 |
| 5,758,893 | 6/1998 | Schultz . |
| 5,769,443 | 6/1998 | Muzny . |
| 5,779,256 * | 7/1998 | Vass ..................................... 280/477 |
| 5,909,892 * | 6/1999 | Richardson .......................... 280/477 |

\* cited by examiner

*Primary Examiner*—Brian L. Johnson
*Assistant Examiner*—Deanna Draper
(74) *Attorney, Agent, or Firm*—Zarley, McKee, Thomte Voorhees & Sease; Dennis L. Thomte

(57) ABSTRACT

A hitch guide for use in guiding a gooseneck trailer hitch into alignment with a hitch ball mounted in the bed of a truck with the gooseneck trailer hitch including a substantially vertically disposed post having a substantially horizontally disposed plate secured to the lower end thereof which has an opening formed therein for receiving the hitch ball. The hitch guide is pivotally secured to the support plate at the lower end of the post and is funnel-shaped to assist in aligning the trailer hitch with the hitch ball.

16 Claims, 5 Drawing Sheets

HITCH GUIDE

BACKGROUND OF THE INVENTION

1. Field of the Invention

This invention relates to a hitch guide and more particularly to a hitch guide for use in guiding a gooseneck trailer hitch into alignment with a hitch ball mounted in the bed of a truck.

2. Description of the Related Art

It is a difficult task to connect the hitch of a trailer or the like to a towing vehicle. It is especially difficult to connect the hitch of a gooseneck trailer to the hitch ball which is positioned in the bed of a truck. The hitching operation is made even more difficult due to the fact that the gooseneck trailers normally have a great amount of weight present on the hitch which makes it difficult to move the trailer so that the trailer hitch may be precisely aligned with the hitch ball on the truck. It is therefore necessary that the truck be precisely positioned with respect to the trailer hitch of the gooseneck trailer.

Many types of alignment devices have been previously provided for trailers, but is believed that there is not a prior art solution to the problem of conveniently connecting the gooseneck hitch of a gooseneck trailer to the hitch ball in the bed of a truck.

SUMMARY OF THE INVENTION

A hitch guide is disclosed for use in guiding a gooseneck trailer hitch into alignment with a hitch ball mounted in the bed of a truck with the gooseneck trailer hitch including a substantially vertically disposed post having a substantially horizontally disposed first support plate secured to the lower end thereof which has an opening formed therein for receiving the hitch ball therein. In most prior art gooseneck trailer hitches, a second plate is pivotally secured to the first support plate and is positioned immediately therebelow with the second plate having an opening formed therein which is adapted to register with the opening in the first support plate when the second plate is pivotally moved to its unlocked position. In the instant invention, the second plate is removed from the post and the hitch guide of this invention is substituted therefore. The hitch guide of this invention comprises a guide plate having a forward end, a rearward end, first and second sides, an upper surface and a lower surface. The rearward end of the guide plate is positioned beneath the first support plate on the vertically disposed post and is pivotally secured to the support plate so as to be movable between locked and unlocked positions. The rearward end of the guide plate has a circular opening formed therein which is adapted to register with the opening in the first support plate when the guide plate is in its unlocked position and which is partially offset therefrom when the guide plate is in its locked position. The guide plate has a ball guide wall extending downwardly from its lower surface for guiding the gooseneck trailer hitch into alignment with the hitch ball so that the openings in the guide plate and the first support plate will be aligned with the hitch ball. The guide plate has an angular ramp portion at its forward end which extends upwardly and forwardly. With the gooseneck trailer hitch being in a stationary position, the truck is backed rearwardly with respect to the trailer hitch so that the hitch ball in the bed of the truck comes into contact with the lower surface of the guide plate within the guide plate wall. The guide plate and the ball guide wall guides the trailer hitch into alignment with the hitch ball so that the hitch ball may be received by the opening in the first support plate and the opening in the guide plate.

It is a principal object of the invention to provide an improved hitch guide.

Still another object of the invention is to provide a hitch guide for use in guiding a gooseneck trailer hitch into alignment with a hitch ball mounted in the bed of a truck.

Still another object of the invention is to provide a hitch guide of the type described above which laterally moves the trailer hitch into alignment with the hitch ball.

Still another object of the invention is to provide a hitch guide of the type described above which is adapted to vertically move the trailer hitch upwardly with respect to the hitch ball or to move the ball hitch downwardly with respect to the trailer hitch through the action of the compression of the truck springs to bring the trailer hitch into alignment with the ball hitch.

Still another object of the invention is to provide a hitch guide which may be easily mounted on a gooseneck trailer hitch without expensive modification thereof.

These and other objects of the invention will be apparent to those skilled in the art.

DESCRIPTION OF THE PREFERRED EMBODIMENT

Figure 1:
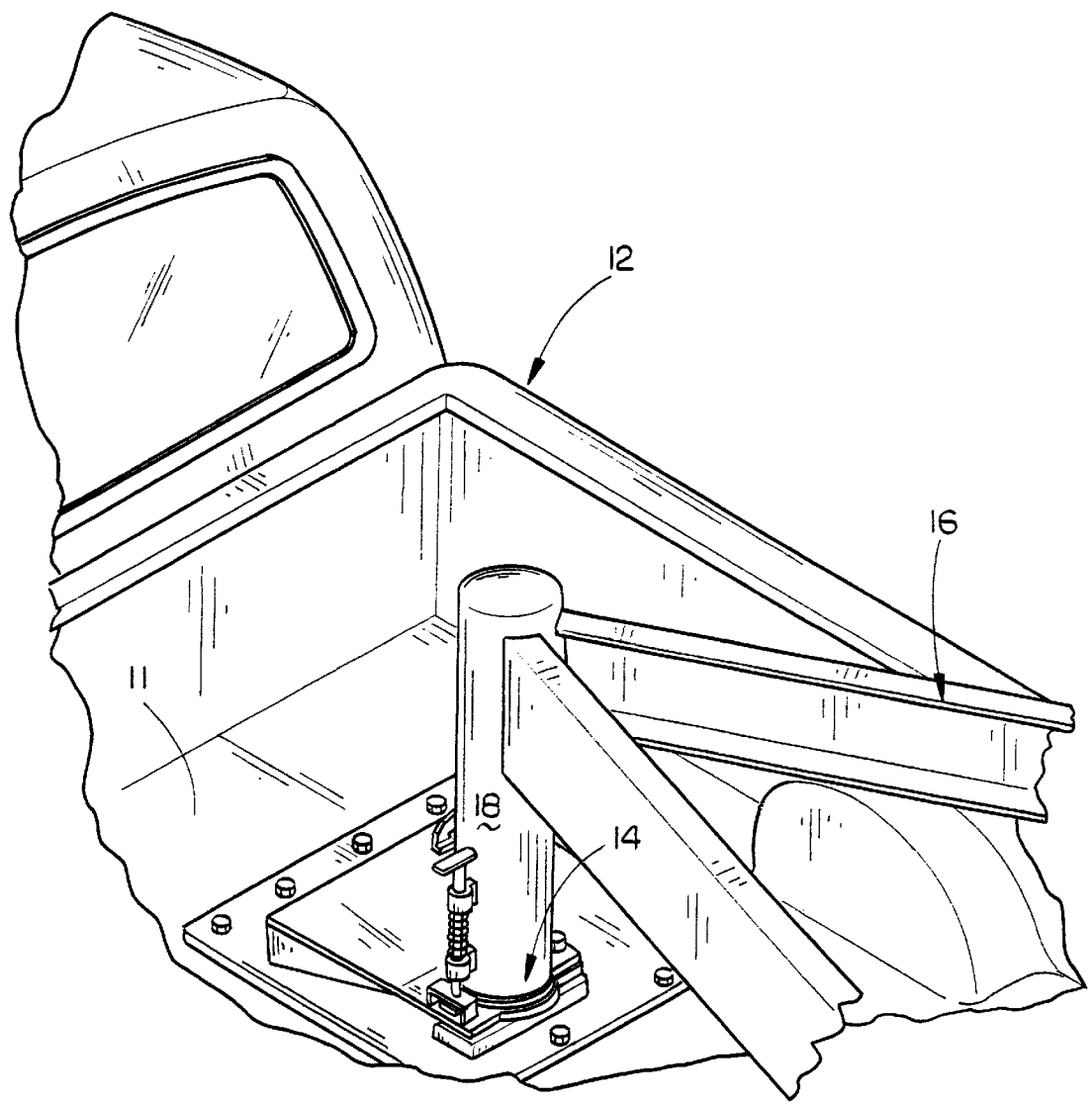
FIG. 1 is a partial rear perspective view of the invention.
Figure 2:
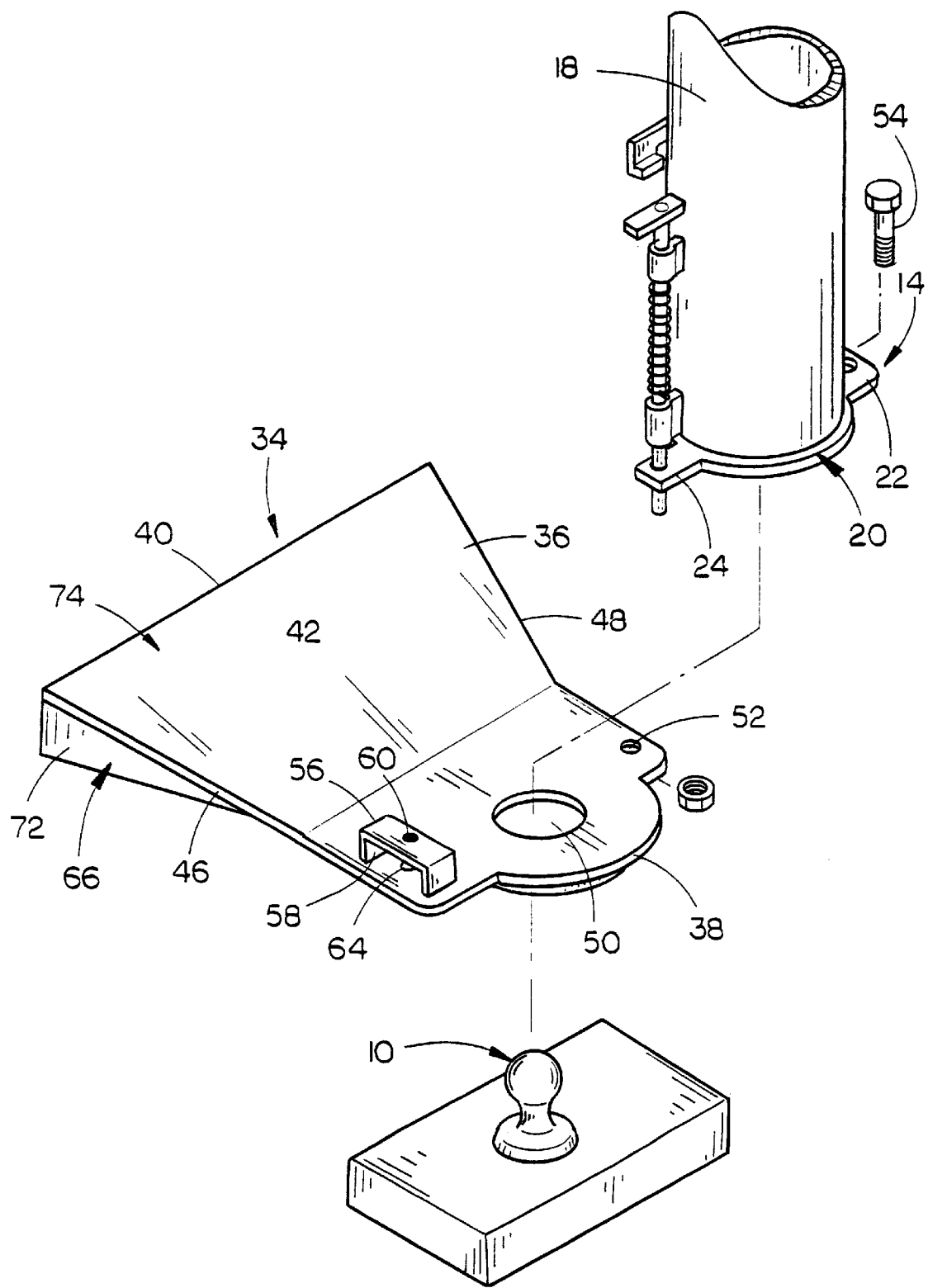
FIG. 2 is an exploded perspective view of the invention and its relationship with respect to the ball hitch and the trailer hitch.

The numeral 10 refers to a hitch ball which is mounted in the bed 11 of a truck 12. The numeral 14 refers generally to the hitch of a gooseneck trailer 16 which includes a substantially vertically disposed post 18. Post 18 has a support plate 20 welded to the lower end thereof which includes ears 22 and 24 extending outwardly therefrom at opposite sides thereof. Support plate 20 has an opening 26 formed therein which is circular in shape and which is adapted to receive the hitch ball 10, as will be described in greater detail hereinafter. Ears 22 and 24 have openings 28 and 30 formed therein, respectively. Opening 28 would normally have a bolt extending therethrough for pivotally connecting a lower locking plate beneath support plate 20. The locking plate, which is omitted from the drawings, would have a circular opening formed therein adapted to register with the opening 26 in support plate 20 when the locking plate is in its unlocked position. The conventional gooseneck trailer hitch 14 also includes a locking shaft or pin 32 of the conventional locking device 62 which is adapted to extend downwardly through opening 30 in support plate 20 and through an opening 50 in the locking plate to lock the locking plate in its locked position, since the opening 50 in the locking plate is offset from the opening 26 in support plate 20 when the locking plate is in its locked position so as to prevent the gooseneck trailer hitch 14 from coming disconnected from the hitch ball 10.

The guide hitch of this invention is referred to generally by the reference numeral 34 and is used in place of the locking plate just described. Guide hitch 34 includes a guide plate 36 having a rearward end 38, forward end 40, upper surface 42, lower surface 44, and opposite sides 46 and 48. Guide plate 36 has a circular opening 50 formed therein adjacent its rearward end and which is adapted to register with the opening 26 in support plate 20 when the guide plate 36 is in its unlocked position. Guide plate 36 has an opening 52 formed at one side thereof which is adapted to receive a bolt 54 to enable guide plate 36 to be pivotally connected to support plate 20 by means of the bolt 54 extending through opening 52 and opening 28 in support plate 20.

The upper surface 42 of guide plate 36 has a bracket 56 welded thereto which defines a generally rectangular opening 58 within bracket 56 which receives ear 24 of support plate 20 so as to limit the amount of pivotal movement of the guide plate 36 with respect to support plate 20. Bracket 56 also has an opening 60 formed therein adapted to receive the locking shaft or pin 32 of the conventional locking device 62. Guide plate 36 also has an opening 64 formed therein beneath bracket 56 which receives the lower end of the shaft or pin 31 of the locking device 62 when the guide plate 36 is in its locked position.

The lower surface 44 of guide plate 36 is provided with a hitch ball guide wall 66 which extends downwardly therefrom. For purposes of description, guide wall 66 will be described as including a rearward U-shaped portion 68 and angled side portions 70 and 72. As seen in the drawings, guide plate 36 is provided with an angled portion 74 which extends upwardly and forwardly from that portion of guide plate 36 which is positioned immediately below support plate 20 for a purpose to be described in more detail hereinafter.

Figure 3:
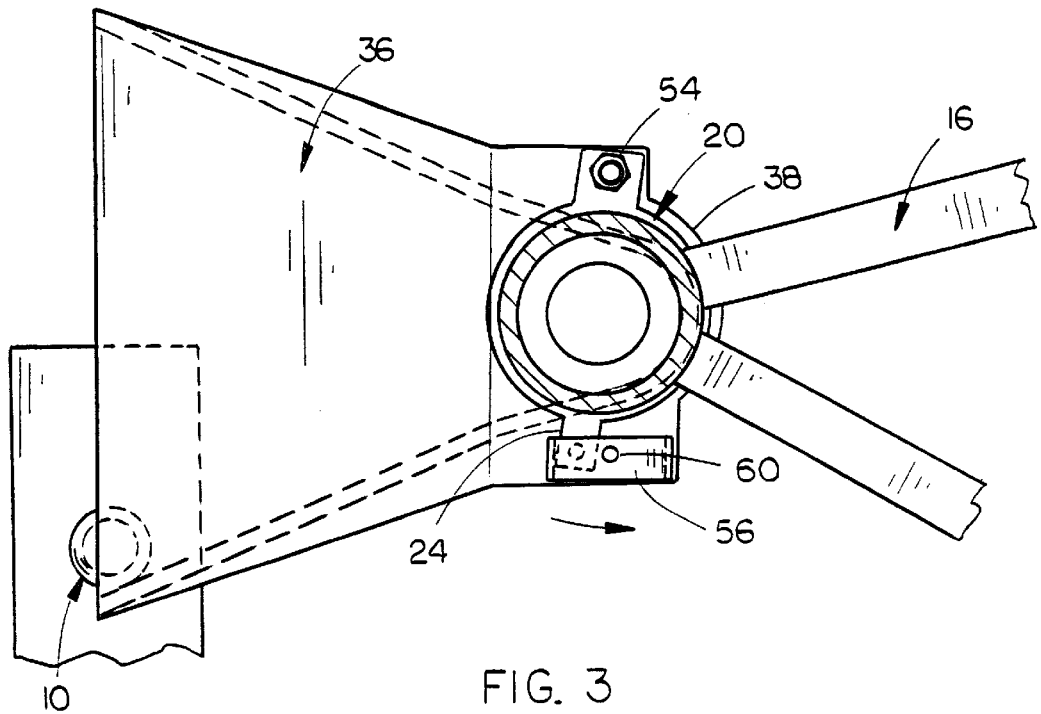
FIG. 3 is a top elevational view illustrating the invention being used to initially align the trailer hitch with the hitch ball.
Figure 4:
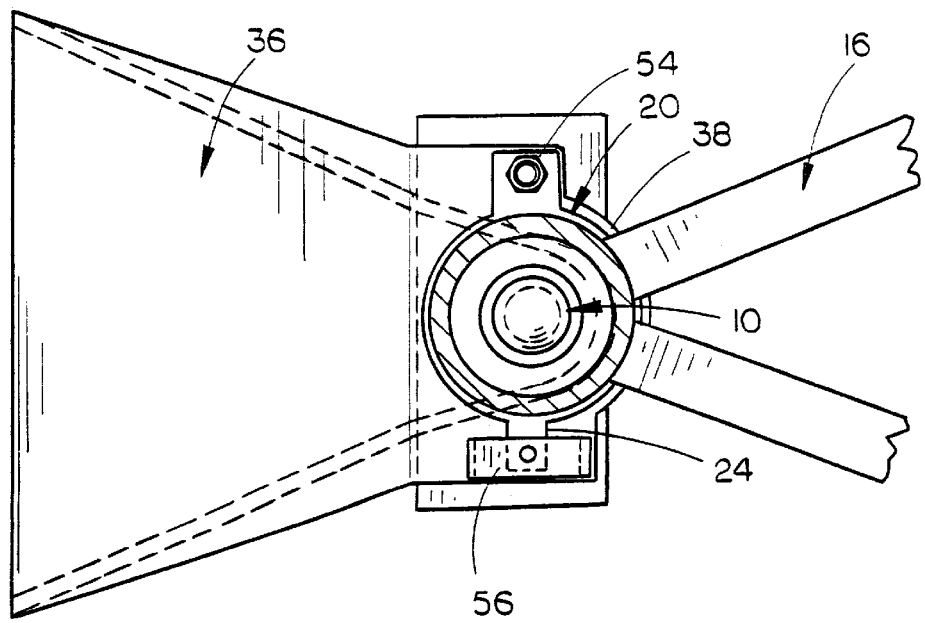
FIG. 4 is a view similar to FIG. 3 except that the ball hitch has been moved into proper alignment with the trailer hitch.
Figure 5:
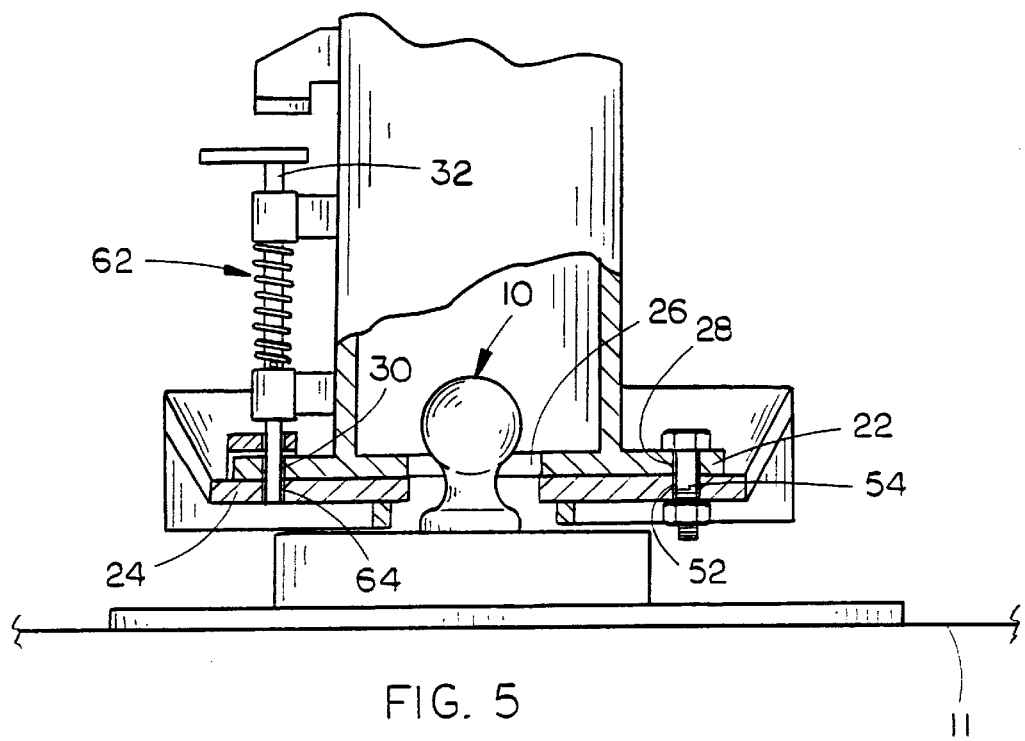
FIG. 5 is a partial vertical sectional view illustrating the hitch ball being received by the hitch guide with the hitch guide in its unlocked position.
Figure 6:
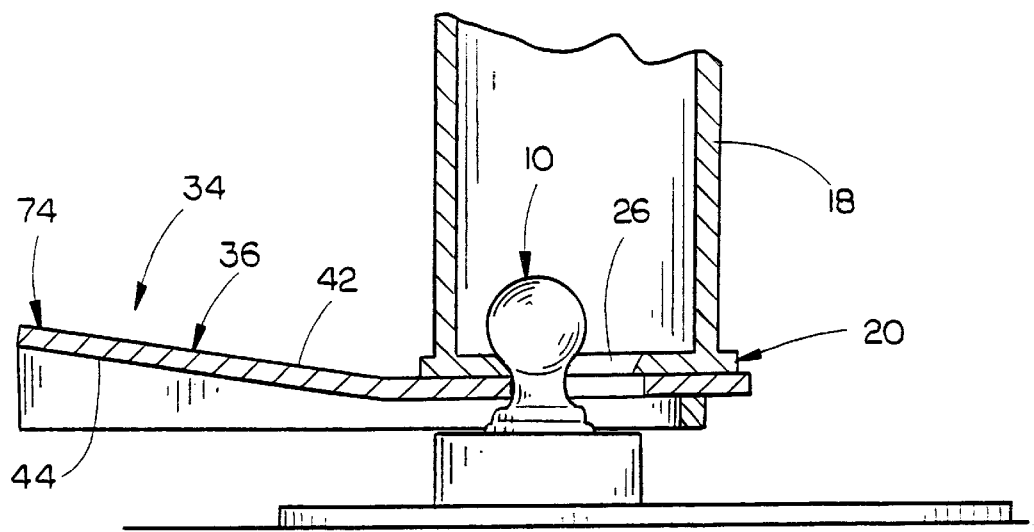
FIG. 6 is a view similar to FIG. 5 except that the hitch guide has been moved to its locked position.
Figure 7:
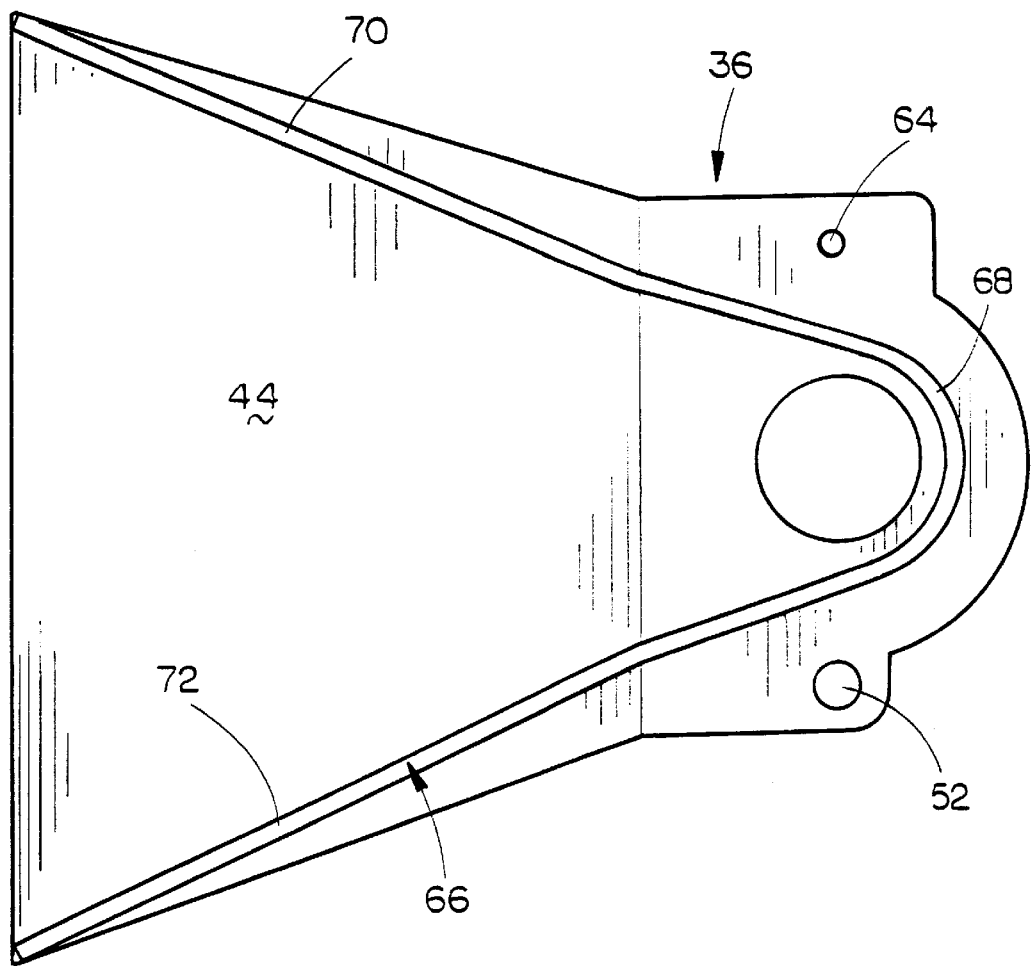
FIG. 7 is a bottom view of the hitch guide of this invention.

The guide hitch 34 of this invention is utilized as follows. Assuming that the gooseneck trailer 16 is detached from the hitch ball 10 of the truck 12 and it is desired to connect the gooseneck trailer 16 to the hitch ball 10, the truck 12 is backed rearwardly with respect to the post 18 and the guide hitch 34. As the truck 12 is backed rearwardly with respect to the trailer 16, the hitch ball 10 is received between the angled side portions 70 and 72 (FIG. 3) with the guide plate 36 being in its unlocked condition. If the hitch ball 10 is not centered perfectly between the angled side portions 70 and 72, the angled side portions 70 or 72 will engage the hitch ball 10 and the continued rearward movement of the truck 12 will cause the post 18 to be moved laterally as the hitch ball 10 moves rearwardly against either side portions 70 and 72. The guide hitch 34 "funnels" the trailer hitch 14 into position until the hitch ball 10 registers with opening 50 in guide plate 36 and opening 26 in support plate 20. At that time, the post 18 of the trailer 16 may be manually lowered in conventional fashion so that the hitch ball 10 is completely received in the opening 50 and the opening 26. The guide plate 36 is then pivotally moved with respect to post 18 so that the locking pin or shaft 32 of the locking device 62 is in alignment with the opening 60 in bracket 56 and opening 64 in guide plate 36 with the locking pin or shaft 32 of the locking device 62 then being received therein to maintain the guide plate 36 in its locked position. In the locked position, the opening 50 in guide plate 36 is offset from the opening 26 in support plate 20 which will prevent the hitch from becoming detached from the hitch ball 10.

During the hitching operation, if the guide hitch 34 is too low with respect to the hitch ball 10, the engagement of the hitch ball 10 with the angled portion 74 will cause the post 18 to be raised as the truck is backed rearwardly or will cause the hitch ball 10 and the truck bed to be lowered against the resiliency of the truck springs until the hitch ball 10 registers with the openings 50 and 26.

Thus it can be seen that the guide hitch of this invention enables the hitch ball 10 to be quickly and easily received by the hitch 14 of the gooseneck trailer 16, even if the truck is not perfectly aligned with the post 18. It can also be seen that the conventional hitch 14 of the gooseneck trailer 16 is easily modified by simply removing the lower locking plate from the hitch 14 and then installing the guide hitch 34 of this invention.

Thus it can be seen that the invention accomplishes at least all of its stated objectives.

I claim:

1. A hitch guide for use in guiding a gooseneck trailer hitch into alignment with a hitch ball mounted in the bed of a truck, said gooseneck trailer hitch including a substantially vertically disposed post having a substantially horizontally disposed support plate secured to the lower end thereof which has an opening formed therein for receiving the hitch ball therein, comprising:

a guide plate having a forward end, a rearward end, first and second sides, and an upper surface and a lower surface;

said rearward end of said guide plate having a circular opening formed therein;

said guide plate rearward end being positioned beneath the support plate and being pivotally secured to the support plate so as to be movable between locked and unlocked positions;

said rearward end of said guide plate having a circular opening formed therein adapted to register with the opening in the support plate when said guide plate is in its said unlocked position and being partially laterally offset therefrom when said guide plate is in its said locked position;

said guide plate having a ball guide wall extending downwardly from its said lower surface for guiding the trailer hitch so that said circular opening and the opening in the support plate will be aligned with the hitch ball.

2. The hitch guide of claim 1 wherein said ball guide wall is generally U-shaped.

3. The hitch guide of claim 1 wherein said guide plate is angled upwardly at its said forward end.

4. The hitch guide of claim 1 wherein said ball guide wall has a generally U-shaped portion at its rearward end and a pair of spaced-apart angled wall portions extending forwardly therefrom.

5. The hitch guide of claim 4 wherein said guide plate is angled upwardly at its said forward end.

6. The hitch guide of claim 1 wherein the gooseneck trailer hitch includes means for locking said guide plate in its said locked position.

7. The hitch guide of claim 1 wherein the support plate has a locking pin opening formed therein and wherein said guide plate has a locking pin opening formed therein which register with one another when said guide plate is in its said locked position, and wherein the gooseneck trailer has a selectively vertically movable locking pin for extension through the registering locking pin openings.

8. The hitch guide of claim 7 wherein the support plate has an ear extending horizontally therefrom, said upper surface of said guide plate having a bracket mounted thereon which movably receives the ear of the support plate to limit the relative movement of said guide plate with respect to the support plate.

9. A hitch guide for use in guiding a trailer hitch into alignment with a hitch ball mounted on a vehicle, said trailer hitch including an upstanding support having a substantially horizontally disposed support plate secured to the lower end thereof which has an opening formed therein for receiving the hitch ball therein, comprising:

a guide plate having a forward end, a rearward end, first and second sides, and an upper surface and a lower surface;

said rearward end of said guide plate having a circular opening formed therein;

said guide plate rearward end being positioned beneath the support plate and being pivotally secured to the support plate so as to be movable between locked and unlocked positions;

said rearward end of said guide plate having a circular opening formed therein adapted to register with the opening in the support plate when said guide plate is in its said unlocked position and being partially laterally offset therefrom when said guide plate is in its said locked position;

said guide plate having a ball guide wall extending downwardly from its said lower surface for guiding the trailer hitch so that said circular opening and the opening in the support plate will be aligned with the hitch ball.

10. The hitch guide of claim 9 wherein said ball guide wall is generally U-shaped.

11. The hitch guide of claim 9 wherein said guide plate is angled upwardly at its said forward end.

12. The hitch guide of claim 9 wherein said ball guide wall has a generally U-shaped portion at its rearward end and a pair of spaced-apart angled wall portions extending forwardly therefrom.

13. The hitch guide of claim 12 wherein said guide plate is angled upwardly at its said forward end.

14. The hitch guide of claim 9 wherein the trailer hitch includes means for locking said guide plate in its said locked position.

15. The hitch guide of claim 9 wherein the support plate has a locking pin opening formed therein and wherein said guide plate has a locking pin opening formed therein which register with one another when said guide plate is in its said locked position, and wherein the trailer has a selectively vertically movable locking pin for extension through the registering locking pin openings.

16. The hitch guide of claim 15 wherein the support plate has an ear extending horizontally therefrom, said upper surface of said guide plate having a bracket mounted thereon which movably receives the ear of the support plate to limit the relative movement of said guide plate with respect to the support plate.

* * * * *